(12) United States Patent
Green et al.

(10) Patent No.: US 6,715,242 B1
(45) Date of Patent: Apr. 6, 2004

(54) STAIRWAY AND RAIL SYSTEM

(75) Inventors: Robert H. Green, Lenoir, NC (US); J. Allen Dyer, Wilkesboro, NC (US)

(73) Assignee: ECMD, Inc., North Wilkesboro, NC (US)

( * ) Notice: Subject to any disclaimer, the term of this patent is extended or adjusted under 35 U.S.C. 154(b) by 0 days.

(21) Appl. No.: 09/899,775

(22) Filed: Jul. 5, 2001

(51) Int. Cl.[7] .................... E04F 11/00; E04F 19/10
(52) U.S. Cl. .................... 52/184; 52/187; 403/6; 403/10; 403/403
(58) Field of Search .................... 52/184, 86, 186, 52/187; 403/6–8, 10, 403; 256/65, 69, 59

(56) References Cited

U.S. PATENT DOCUMENTS

| | | | |
|---|---|---|---|
| 3,748,802 A | * 7/1973 | Verderio | 256/65.01 |
| 4,300,850 A | * 11/1981 | de la Haye et al. | 403/245 |
| 4,421,302 A | * 12/1983 | Grimm et al. | 256/59 |
| 4,619,084 A | * 10/1986 | Snitman | 182/178.1 |
| 4,886,245 A | * 12/1989 | Manzo | 256/65.08 |
| 5,095,668 A | * 3/1992 | O'Brien et al. | 256/22 |
| 5,261,201 A | 11/1993 | Smith | 52/184 |
| 5,787,664 A | * 8/1998 | Hollander et al. | 256/65.11 |
| 5,907,935 A | * 6/1999 | Elena | 256/65.15 |
| 6,015,138 A | * 1/2000 | Kohlberger et al. | 256/65.14 |
| 6,015,139 A | * 1/2000 | Weber | 256/65.14 |
| 6,164,629 A | * 12/2000 | Michael et al. | 256/59 |
| 6,290,212 B1 | * 9/2001 | Bartel | 256/59 |

FOREIGN PATENT DOCUMENTS

GB 2186604 * 2/1986 ............ E04F/11/18

OTHER PUBLICATIONS

Photocopy of Coffman catalog; 1995.
Photocopy of L.J. Smith caralog; 1997.
Photocopy of Creative Stair Parts; 1998.
Photocopy of Horner Architectural Products catalog; May 2000.
Photocopy of Crown Heritage Stair Systems catalog; Copyright 2000.
Photocopy of Sheraton catalog; undated.

* cited by examiner

*Primary Examiner*—Carl D. Friedman
*Assistant Examiner*—Chi Q. Nguyen
(74) *Attorney, Agent, or Firm*—MacCord Mason PLLC (57) ABSTRACT

A stairway and rail system. The stairway system includes a plurality of spaced apart treads; at least one baluster per tread; a two-piece handrail assembly; and a lateral support for supporting the handrail. In the preferred embodiment, the handrail assembly includes: a top segment; a bottom segment; a mating surface on one of the top segment and the bottom segment for aligning the top segment with the bottom segment; and a fastener groove between the top segment and the bottom segment for permitting the accommodation of fasteners used to attach the handrail to each baluster.

38 Claims, 9 Drawing Sheets

STAIRWAY AND RAIL SYSTEM

BACKGROUND OF THE INVENTION (1) Field of the Invention

The present invention relates generally to stair rails and, more particularly, to a stair rail system having a two-piece handrail assembly.

(2) Description of the Prior Art

In stairway systems aesthetics and construction quality are very important. This applies to not only the treads and balusters but also to the handrail and newels of a stairway system. An adequate competence level of skill is often lacking in both the labor market and in the "do-it-yourself" market. To address this, it is desirable to have a stairway and rail system that lowers the required competence level in carpentry by, for example, removing or minimizing the amount of measuring, cutting, drilling, and chiseling involved in installing the stairway system. Similarly, it is also desirable to have subcomponents, such as handrails, balusters and ends inclosing volutes, turnouts, caps, upeasings and overeasings, that also lower the required competence level in carpentry in installing the subcomponents.

Also, as people desire to become involved in "do-it-yourself" home renovations, achieving the high standard of construction quality traditionally obtained through custom carpentry is difficult for the average weekend carpenter. Alternatives for maintaining construction quality and aesthetics have included prefabricated stairway systems; however, these alternatives are not always suitable for installation by those lacking an adequate competence level in carpentry to create a stair system. In addition, such prefabricated systems are usually much more costly to manufacture.

Thus, there remains a need for a stairway and rail system having a two-piece handrail assembly which may be easily installed while, at the same time, can be economically produced and sold.

SUMMARY OF THE INVENTION

The present invention is directed to a stairway and rail system. The stairway system includes a plurality of spaced apart treads; at least one baluster per tread; a two-piece handrail assembly; and a lateral support for supporting the handrail. In the preferred embodiment, the handrail assembly includes: a top segment; a bottom segment; a mating surface on one of the top segment and the bottom segment for aligning the top segment with the bottom segment; and a fastener groove between the top segment and the bottom segment for permitting the accommodation of fasteners used to attach the handrail to each baluster.

The handrail assembly may further include an attachment means for attaching the handrail to each baluster. Preferably, the attachment means is a plow for receiving the top of a square top baluster or a pin top baluster adapter for receiving the top of a pin top baluster, such as a strip with a plurality of spaced apart openings. The attachment means may further include fillet strips between adjacent balusters.

In the preferred embodiment, the top segment and the bottom segment are each made from lumber having a rough-cut designation is between about 5/4 and 6/4 for economical savings. In the preferred embodiment, the rough-cut designation is about 5½/4 which provides the most significant cost savings.

In the preferred embodiment, the lateral support is a newel. One end of the newel is connected to the handrail and the other end of the newel is vertically anchored to the floor of the structure or to at least one tread. In the preferred embodiment, the newel is a three-piece newel assembly includes a center core and two substantially identical outer members. Preferably, the three-piece newel assembly further includes a mating alignment groove on one of the center core and the two substantially identical outer members.

Accordingly, one aspect of the present invention is to provide a stairway and rail system, the stairway system including: a plurality of spaced apart treads; at least one baluster per tread; and a two-piece handrail, the handrail having a top segment, a bottom segment and a mating surface on one of the top segment and the bottom segment for aligning the top segment with the bottom segment.

Another aspect of the present invention is to provide a two-piece handrail assembly for creating a handrail for use in a stairway rail system, the stairway system including a plurality of spaced apart treads and at least one baluster per tread. The two-piece handrail assembly includes: a top segment; a bottom segment; a mating groove on one of the top segment and the bottom segment for aligning the top segment with the bottom segment; and a fastener groove between the top segment and the bottom segment for permitting the accommodation of fasteners used to attach the handrail to each baluster.

Still another aspect of the present invention is to provide a stairway and rail system. The stairway system including: a plurality of spaced apart treads; at least one baluster per tread; a two-piece handrail assembly, the handrail including: (i) a top segment; (ii) a bottom segment; (iii) a mating groove on one of the top segment and the bottom segment for aligning the top segment with the bottom segment; and (iv) a fastener groove between the top segment and the bottom segment for permitting the accommodation of fasteners used to attach the handrail to each baluster; and a lateral support for supporting the handrail.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
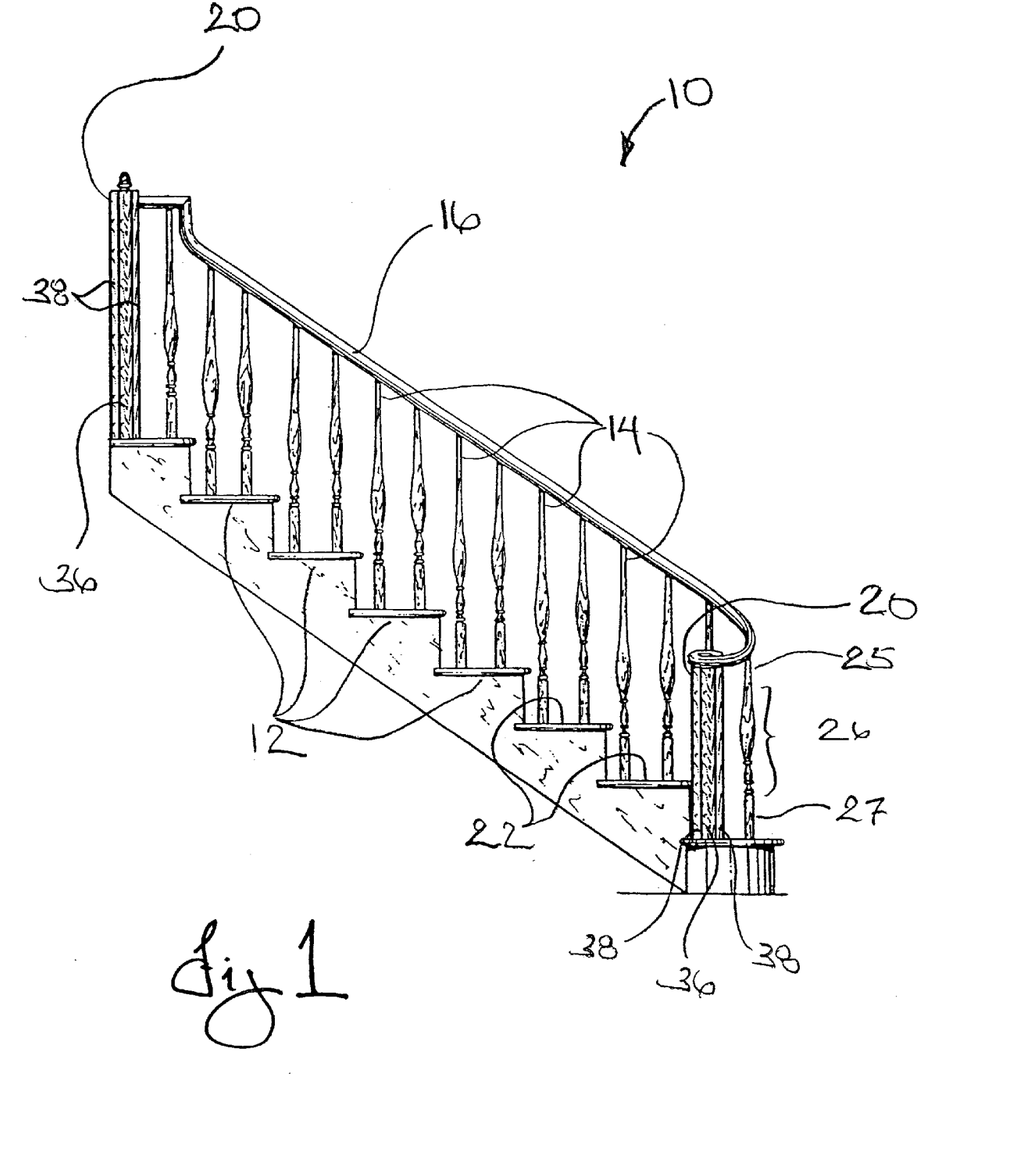
FIG. 1 is the stairway and rail system constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a stairway system, generally designated 10, is shown constructed according to the present invention. The stairway system 10 includes three major sub-assemblies: a plurality of spaced apart treads 12; a handrail 16; and at least one baluster per tread 14.

Figure 2:
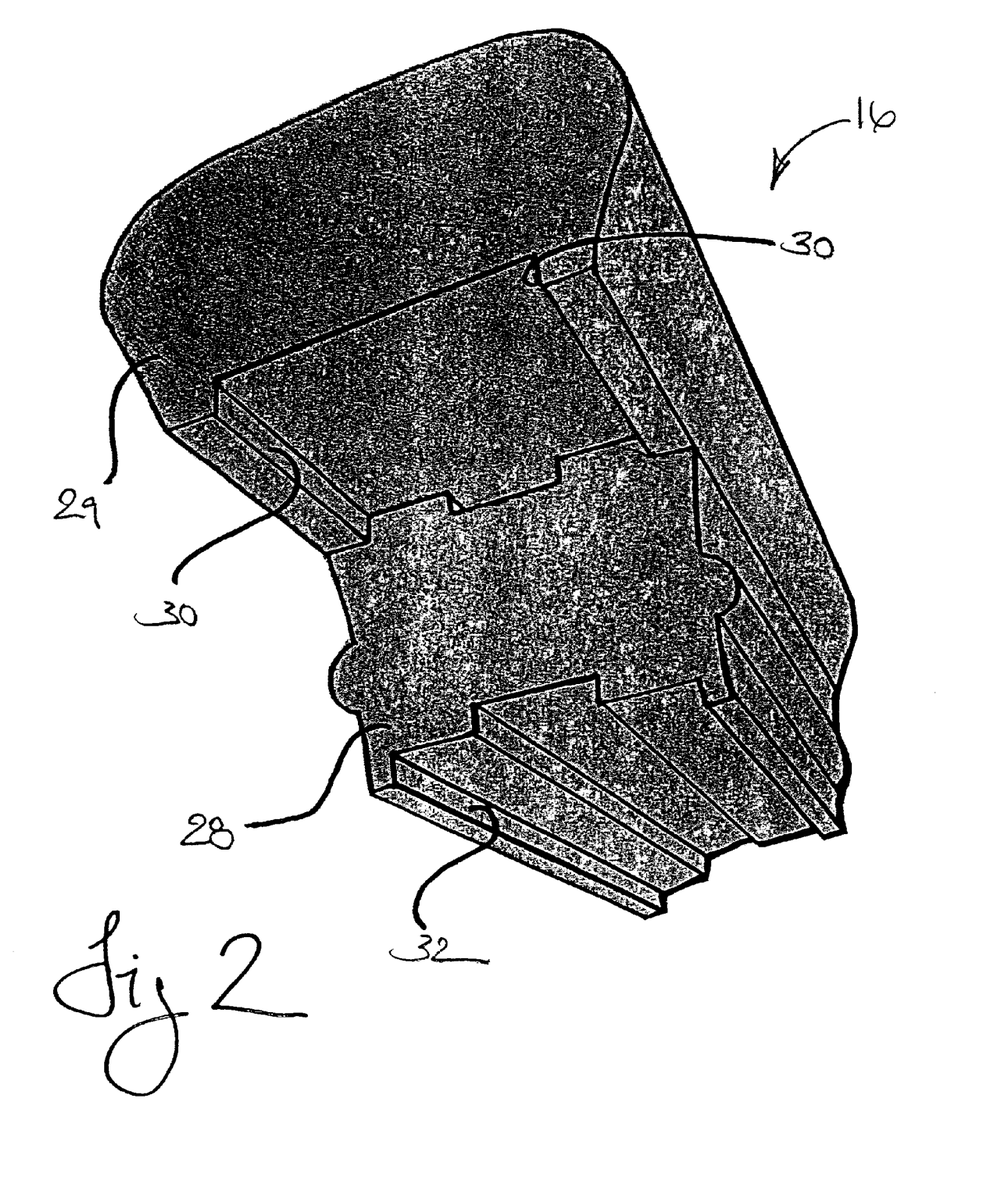
FIG. 2 is a perspective schematic illustration of a two-piece handrail assembly for use in the stairway and rail system of FIG. 1 looking from the bottom segment of the handrail assembly toward the top segment.

The handrail 16 may be pieced together from a two-piece handrail assembly 16 thereby providing accommodation for the lower carpentry skill found in the labor market and in the "do-it-yourself" market. FIG. 2 shows the two-piece handrail assembly 16 looking from the bottom segment 28 toward the top segment 29 that provides a view of a mating groove 30 that may be created by plowing into a bottom of top segment 29 and milling a corresponding mating ridge on a top of bottom segment 28. Those skilled in the art will appreciate that, alternatively, the mating may be created by plowing into the top of the bottom segment 28 and milling a corresponding mating ridge on the bottom of top segment 29. The spacing between the plowed portion and the milled portion of the mating groove 30 may be such to accommodate a head or extended portion of fasteners that may be used to secure handrail 16, a baluster 14 or lateral support 20. While not shown, additional grooves could be added in both the plowed bottom of the top segment 29 and the milled top of the bottom segment 28. These additional grooves are optional and may further accommodate various types of fasteners when bottom segment 28 is secured to a baluster 14 or lateral support 20.

Various fastening techniques and structures may be used to secure the handrail 16 to baluster 14 or lateral support 20. FIG. 2 shows an attachment means 32 as a plow in the bottom of bottom segment 28. The means for attaching may further include without limitation screwing, bolting, nailing, gluing or any fastening technique or structure that accomplishes securing the bottom segment 28 to a baluster 14 or lateral support 20. Also shown in FIG. 2 in the plow in the bottom of bottom segment 28 is an optional smaller groove.

Figure 3:
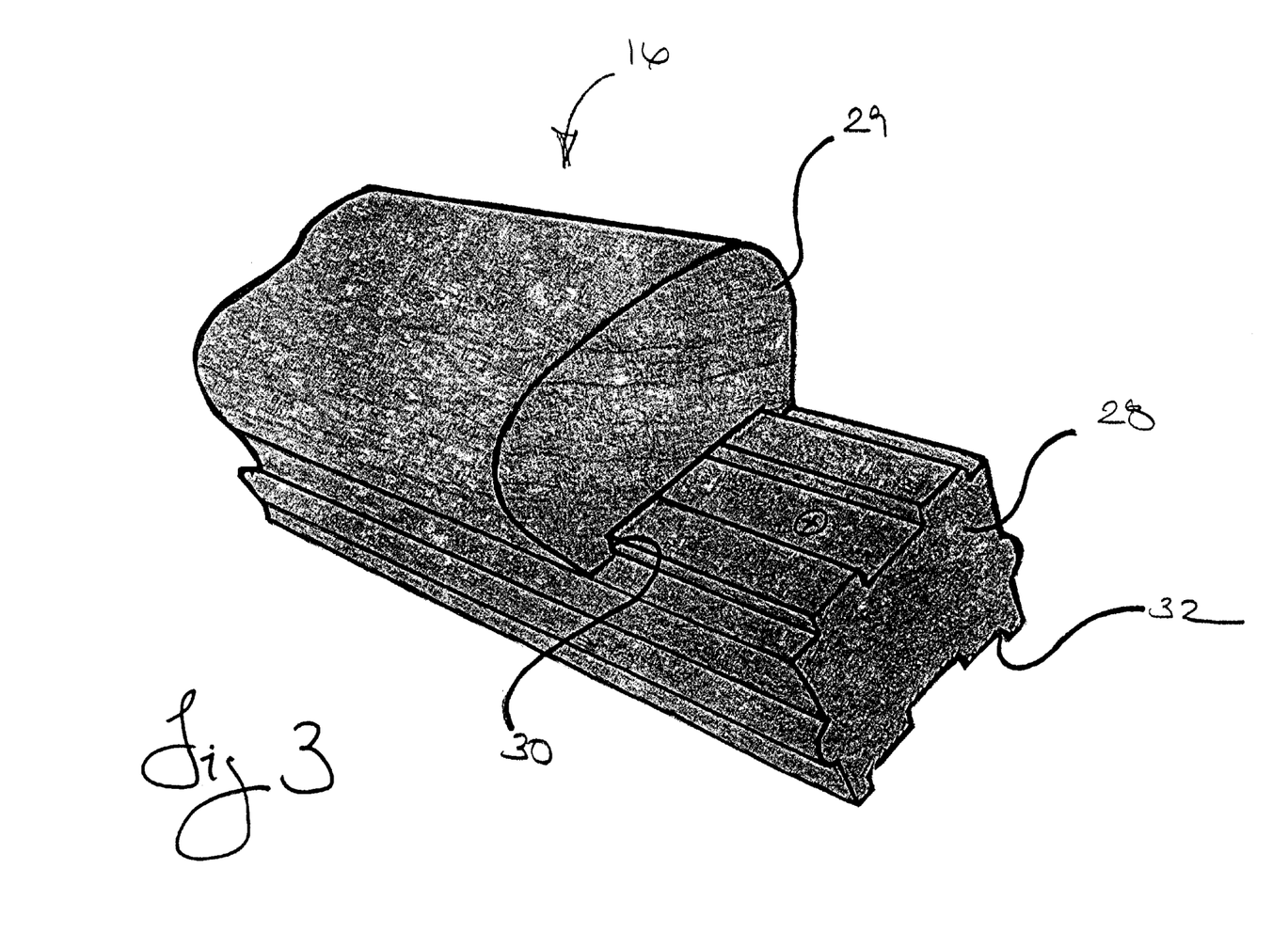
FIG. 3 is a different perspective schematic illustration of a two-piece handrail assembly of FIG. 2 for use in the stairway and rail system of FIG. 1 looking from the top segment of the handrail assembly toward the bottom segment.

An alternative view of two-piece handrail assembly 16 is shown in FIG. 3. As in FIG. 2, the top segment 29 mates with the bottom segment 28 by means of mating groove 30. Likewise, there may be additional grooves within both the top segment 29 and the bottom segment 28 at the mating groove 30 that may be used, for example, to accommodate the head or extended portions of fasteners. For example, the top of a screw as shown here is shown substantially flush with the top surface of a groove in the milled top of bottom segment 28. Also, the attachment means 32 is shown as a plow in the bottom of bottom segment 28.

Figure 4:
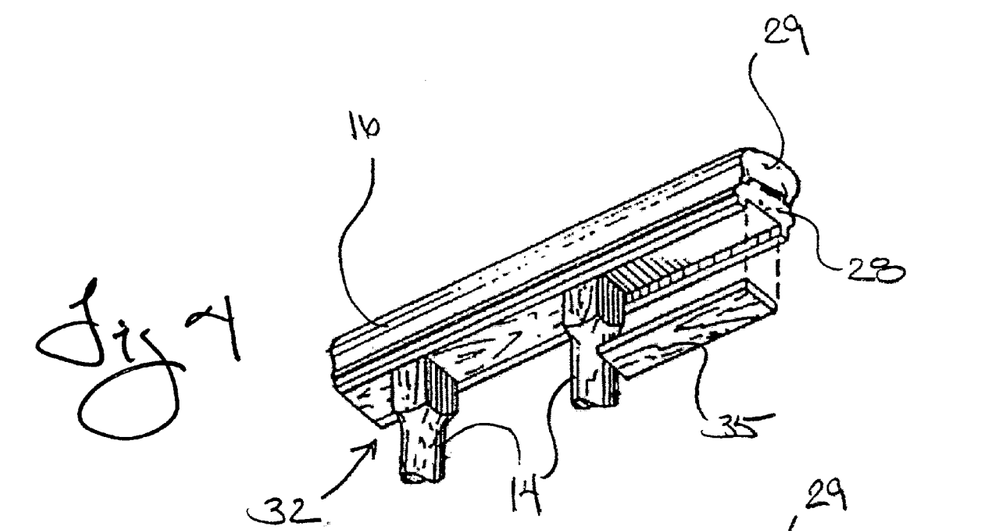
FIG. 4 is a perspective schematic illustration of a two-piece handrail assembly for use in the stairway and rail system of FIG. 1 showing an incorporation of square-top balusters.
Figure 5:
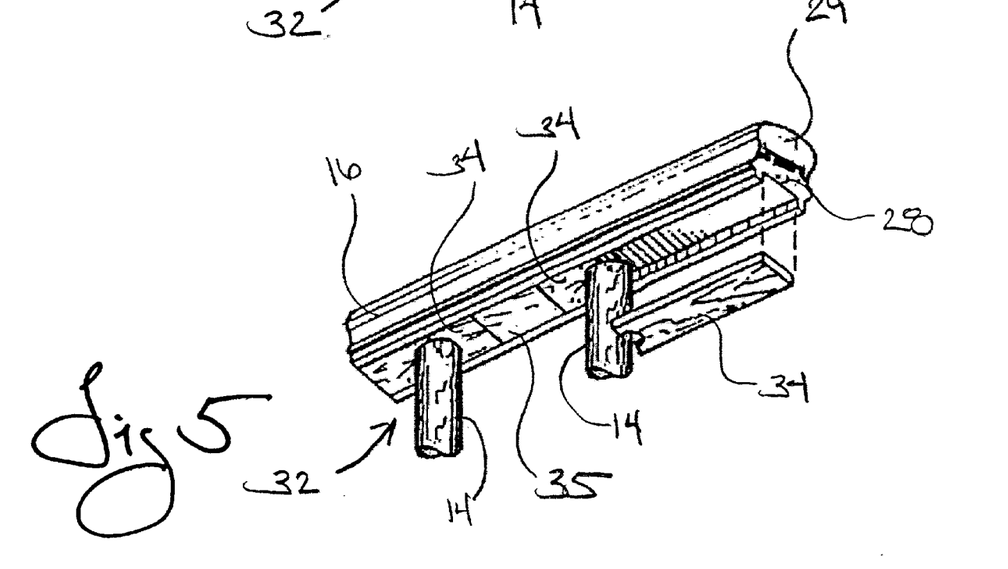
FIG. 5 is a perspective schematic illustration of a two-piece handrail assembly for use in the stairway and rail system of FIG. 1 showing an incorporation of pin-top balusters.

Various styles of balusters 14 may be used with the two-piece handrail assembly 16 when assembling a stairway system 10 according to the present invention. Popular styles of balusters 14 may include square top balusters and pin top balusters. To that end, attachment means 32 may include further techniques and structures to finish or enhance the aesthetics of the stairway system 10. Among these further techniques and structures may be a fillet strip 35 that is shown in FIG. 4 as a slat of wood finished to fit into the plow in the bottom of the bottom segment 28. When pin top balusters are used, fillet strips 35 may be used to accommodate the difference between the width of the plowed groove of the attachment means 32 and diameter of the pin top baluster. Holes may be formed within the slats to create pin top adapters 34. In addition, to provide flexibility for accommodating a variety of angles for the rise of the handrail 26 that may be encountered in installing a stairway system 10, such angles typically run from about 38 to about 42 degrees. The holes having play may be cut to allow for such a variation in angle between the pin top baluster longitudinal direction and the handrail longitudinal direction. When pin top adapters 34 are used, fillet strips 35 may be placed between pin top adapters 34 to accommodate baluster spacing variation resulting from varying either the number of balusters per tread and/or the riser angle.

With respect to manufacturing a stair system according to the present invention, there are advantages that may inure to the manufacturer of a two-piece handrail assembly 16. These advantages relate to the practices and pricing for buying and selling lumber pieces in the market used to manufacture a part, such as a handrail 16, from an assembly. A handrail 16 may be made from a single piece of lumber or from multiple pieces of lumber. For this invention it is advantageous to manufacture a handrail 16 from a multiple-piece assembly—preferably a two-piece assembly. In addition to the low cost of manufacturing a handrail 16, an ease of assembly for those having less than an adequate competence level in carpentry and "do-it-yourselfers" is believed to be desirable. To that end, a two-piece handrail assembly 16 may be particularly advantageous. Another desirable attribute for a two-piece handrail assembly 16 is that when finished with a clear varnish, stain or lacquer, the lumber used is clear lumber to accentuate the wood grain and beauty.

Typically, a manufacturer obtains rough-cut lumber that has traditionally been sold in the United State in quarters, i.e. X/4 (e.g., 1/4, 2/4, 3/4, 4/4, 5/5, 6/4, 7/4, 8/4 . . . etc.). The X/4 designation means that the lumber in rough-cut form is nominally X quarters of an inch thick. Traditionally, in the manufacture of handrails 16 the finished bottom-to-top dimension is about 2 3/8 to 2 1/2 inches where 2 3/8 is typically about the smallest standardized size. A manufacturer has available to him rough-cut lumber ranging from 1/4 to 8/4 and greater as summarized below in Table 1.

TABLE 1

| ROUGH-CUT DESIG-NATION | RANGE OF ACTUAL SIZE | SIZE RANGE IN SIX-TEEN-THS | SIZE RAN-GE AFTER MILL-ING | NUMBER OF MILLED PIECES TO GET AT LEAST 40/16 | UNIT COST | TOTAL COST |
|---|---|---|---|---|---|---|
| 1/4 | 1/8–1/4 | 2/16–4/16 | 0/16–2/16 | 20 | 1/4 | 20/4 |
| 2/4 | 3/8–2/4 | 6/16–8/16 | 4/16–6/16 | 7 | 2/4 | 14/4 |
| 3/4 | 5/8–3/4 | 10/16–12/16 | 8/16–10/16 | 4 | 3/4 | 12/4 |
| 3½/4 | 6/8–3½/4 | 12/16–14/16 | 10/16–12/16 | 4 | 3/4 | 12/4 |
| 4/4 | 7/8–4/4 | 14/16–16/16 | 12/16–14/16 | 3 | 4/4 | 12/4 |
| 5/4 | 9/8–5/4 | 18/16–20/16 | 16/16–18/16 | 3 | 5/4 | 15/4 |
| 5½/4 | 10/8–5½/4 | 20/16–22/16 | 18/16–20/16 | 2 | 5/4 | 10/4 |
| 6/4 | 11/8–6/4 | 22/16–24/16 | 20/16–22/16 | 2 | 8/4 | 16/4 |
| 7/4 | 13/8–7/4 | 26/16–28/16 | 24/16–26/16 | 2 | 13/4 | 26/4 |
| 8/4 | 15/8–8/4 | 30/16–32/16 | 28/16–32/16 | 2 | 20/4 | 40/4 |

Rough-cut lumber designations are nominal, so the actual size may range in a manner as set fourth in column 2 of Table 1. For example a 5/4 piece of rough-cut lumber may range in size from about 9/8 of an inch to about 5/4 of an inch. Prior to assembling a multiple-piece assembly, rough-cut lumber is milled to smooth furring and saw blade marks, if present. During milling the dimension for each surface is reduced by 1/16 of an inch. Since both surfaces of a piece of lumber are milled, the range in thickness of a piece of lumber is decreased by about 1/8 of an inch as set fourth in column 4 of Table 1. To achieve a milled overall thickness of about 2 3/8 to 2½ inches after assembly and further milling, an assembled thickness of about 2½ to 2 5/8 inches is desired. Thus a thickness of at least about 2½ inches may be desired, or as expressed in sixteenths 40/16.

Set fourth in column 5 of Table 1 is the number of pieces of a particular rough-cut designation a manufacturer would need to achieve 40/16. For example, either three pieces of 4/4 rough-cut lumber, three pieces of 5/4 or two pieces of 6/4 rough-cut lumber may be used to make a multiple-piece handrail having an after assembled and milled dimension of about 2 3/8 inches.

Different rough-cut lumber designations have different unit costs as set fourth in column 7 of Table 1. The cost of 4/4 rough-cut lumber designations may be taken as a standard of about 1 unit (i.e., 4/4 in Table 1). Various factors affect the unit of cost rough-cut lumber including overall length, clearness, which is an absence of knots or other types of defects that may occur in the lumber, and nominal thickness. The general availability of rough-cut lumber having a greater nominal thickness and longer length may be low; therefore, the unit cost may be high.

Another factor affecting unit price of rough-cut lumber is seasoning time (for example the time for kiln drying a piece); therefore, the unit cost for rough-cut lumber having a greater nominal thickness increases with greater thickness. For example, a 4/4 piece of rough-cut lumber may have an about 30 day kiln dry time; a 6/4 piece of rough-cut lumber may have an about 48 day kiln dry time; and a 8/4 piece of rough-cut lumber may have more than an about 72 day kiln Within the scheme of rough-cut lumber size, availability and cost is a heretofore-unrecognized unique combination in manufacture of two-piece handrails where the use of about 5/4 to about 6/4 rough-cut lumbers provides both a cost and a skill level advantage. In particular, this advantage occurs at a location that may be designated, for example, as an about 5½/4 piece rough-cut lumber. A substantial cost advantage may be realized by a manufacturer when using two about 5½/4 pieces of rough-cut lumber to create two-piece handrail 16 as described above and shown in FIGS. 2, 3, 4, and 5. Likewise, a substantial product advantage is also realized for the low skilled labor market and "do-it-yourself" market. The cost advantage may be understood with reference to Table 1 above, Table 2 below and FIG. 6.

TABLE 2

| ROUGH CUT DESIGNATION | NUMBER OF PIECES | TOTAL COST | NUMBER OF PIECES | TOTAL COST | NUMBER OF PIECES | TOTAL COST | NUMBER OF PIECES | TOTAL COST |
|---|---|---|---|---|---|---|---|---|
| 1/4 | N/A | N/A | N/A | N/A | N/A | N/A | N/A | N/A |
| 2/4 | N/A | N/A | N/A | N/A | N/A | N/A | 7 | 14/4 |
| 3/4 | N/A | N/A | N/A | N/A | 4 | 12/4 | 7 | 21/4 |
| 3½/4 | N/A | N/A | N/A | N/A | 4 | 12/4 | 7 | 21/4 |
| 4/4 | N/A | N/A | 3 | 12/4 | 4 | 16/4 | 7 | 28/4 |
| 5/4 | N/A | N/A | 3 | 15/4 | 4 | 20/4 | 7 | 35/4 |
| 5½/4 | 2 | 10/4 | 3 | 15/4 | 4 | 20/4 | 7 | 35/4 |
| 6/4 | 2 | 16/4 | 3 | 24/4 | 4 | 32/4 | 7 | 56/4 |
| 7/4 | 2 | 26/4 | 3 | 39/4 | 4 | 52/4 | 7 | 91/4 |
| 8/4 | 2 | 40/4 | 3 | 60/4 | 4 | 80/4 | 7 | 280/4 |

Table 2 presents the data of Table 1 from a different perspective. Specifically, Table 2 presents the same number of pieces of the different rough-cut designations required to achieve at least 40/16 and the resulting total costs for using incrementally thicker rough-cut designations. For example, when using two pieces of rough-cut lumber to create a two-piece handrail assembly, one may use two pieces from the minimum of 5½/4 rough-cut designation to the 8/4 rough-cut designation and more as set fourth in column 2 of Table 2. When using three pieces of rough-cut lumber to create a multiple-piece handrail assembly, one may use three pieces from the minimum of 4/4 rough-cut designation to the 8/4 rough-cut designation and more as set fourth in column 4 of Table 2.

For each of the two-piece handrail assembly and the three-piece handrail assembly there is a minimum rough-cut lumber designation below which the smaller rough-cut lumber designations will not create a thick enough assembly. Likewise, when four pieces are used the minimum rough-cut lumber designation is 3/4 as set fourth in column 6 of Table 2. When seven pieces are used the minimum rough-cut lumber designation is 7/4 as set fourth in column 8 of Table 2. When using the 1/4 rough-cut lumber designation, a twenty-piece assembly is needed. For a single piece assembly, the minimum rough-cut lumber designation would be 11/4. The data of Table 2 presents graphically the total cost as a function of rough-cut lumber designation used to manufacture a multiple-piece assembly to achieve a thickness of at least 2 3/8 after assembly and further milling.

Figure 6:
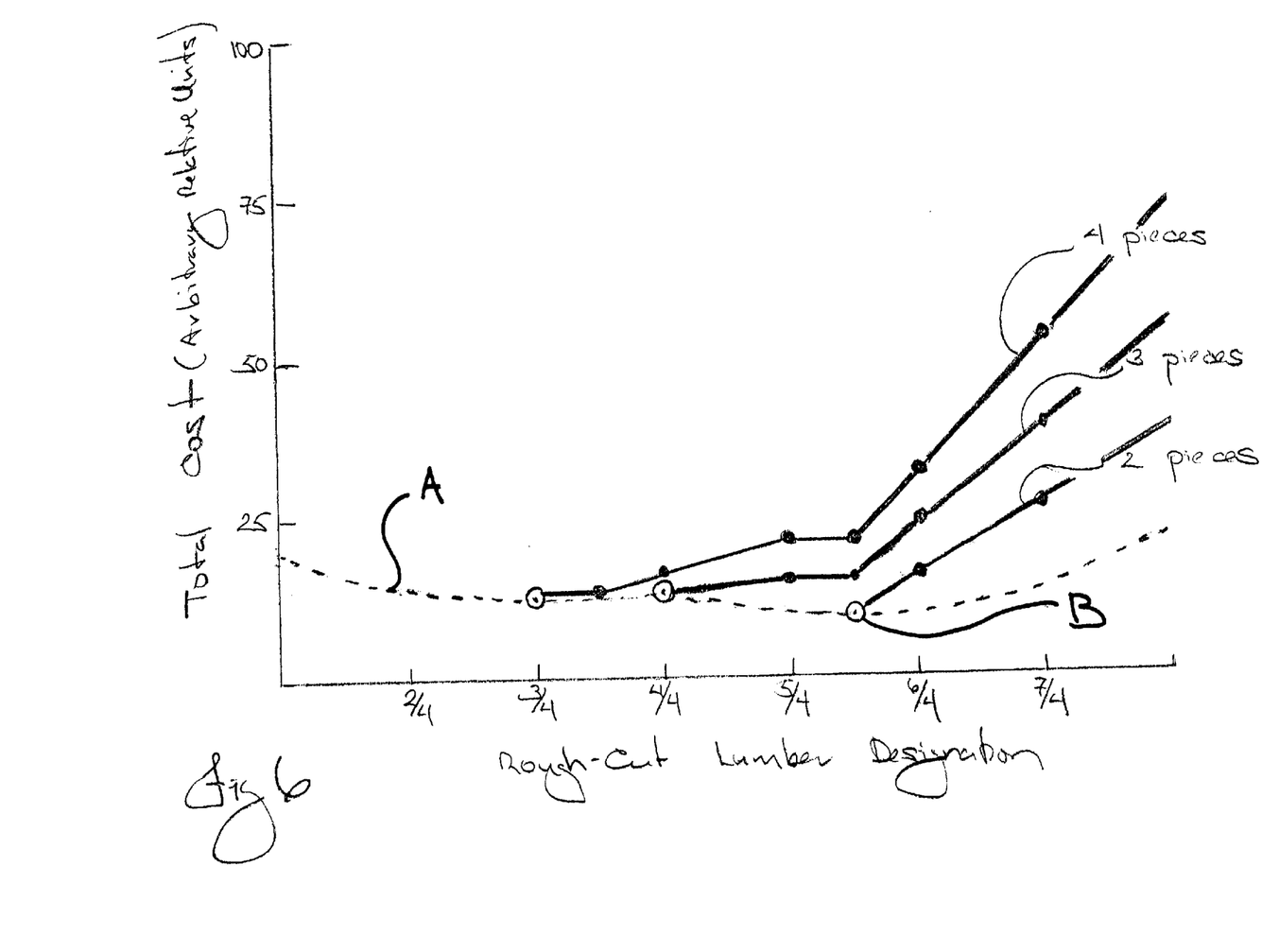
FIG. 6 is a graph of the Total Cost for multiple piece handrail assemblies as a function of the number of pieces of lumber used to construct the handrail from a starting rough cut lumber designation.

FIG. 6 is the graphical presentation of the data for two-piece, three-piece and four-piece assemblies plotted as three curves. Each curve begins with a data point having a dot within a circle. The dot within the circle indicates the minimum thickness that can be used to achieve the overall thickness for a multiple-piece assembly after assembly and further milling. For example, for a four-piece assembly the minimum rough-cut lumber designation is 3/4 having a unit cost of about 4/4 units for a total cost of about 12/4 which is shown for convenience as 12 arbitrary relative units in FIG. 6. Likewise, for a three-piece assembly, the minimum rough-cut lumber designation is 4/4 having a unit cost of about 3/4 unit for a total cost of about 12/4 which is shown for convenience as 12 arbitrary relative units in FIG. 6. Also, for a two-piece assembly, the minimum rough-cut lumber designation falls somewhere between 5/4 and 6/4 having a unit cost of about 5/4 for a total cost of about 10/4 which is shown for convenience as 10 arbitrary relative units in FIG. 6.

A dashed line, designated A in FIG. 6, has been used to join total cost for the minimum rough-cut of three curves. This dashed line is a minimum cost boundary for the manufacture of a handrail. Between the 5/4 and 6/4 rough-cut lumber designations lies the minimum total cost for many possible multiple-piece assemblies—designated as 10/4 in Tables 1 and 2, identified by the letter B and designated for convenience as 10 arbitrary relative units in FIG. 6.

Again referring to the stairway system 10 of FIG. 1, the at least one baluster 14 may be at least two balusters 14 including a first baluster and a second baluster. Each baluster may include a top length segment 25, a turning length segment 26 and a bottom length segment 27. The spaced treads 12 include a foot support surface 22. Typically, the width of the tread is greater than the depth of the tread. There is a means for attaching the stairway system 10 to a structure. One method includes a stringer. Other methods are wall supports or floor supports. The handrail 16 may be separated from the spaced treads 12 by a lateral support 20. Various types of lateral supports 20 may be a newel.

With respect to the at least two balusters 14, it may be particularly desirable for the bottom length features to align with the foot support surface 22 of the tread and the top length feature to align with the handrail slope. To accomplish this it is desirable to incrementally change the turning length segment 26 of the second baluster to the first baluster.

In the stairway system 10, the number of treads is based on the finished floor to finished floor height in a structure. The number of treads is dictated by the riser height. Typically, the riser height is uniform and ranges from about 6" and about 9". Within the United States the riser height more typically is designated at about 7½". In a two baluster per tread configuration the spacing between the balusters is the tread depth divided by two (e.g., D/2), which is the number of balusters per tread. In a three baluster per tread configuration the spacing between the balusters is D/3 or the tread depth divided by the number of balusters. Each baluster in the system may include a top length segment 25, a turning length segment 26 and a bottom length segment 27.

It may be particularly desirable to have the top length segment 25 align from baluster to baluster and with the handrail 16 while the bottom length segment 27 aligns from baluster to baluster and with the tread. To accomplish this, the turning length segment 26 from one baluster to the next may be incrementally changed. Unexpectedly, the amount of incremental change is not substantially dependent on the tread depth; however, it may be only dependent on the number of balusters per tread.

To create stairway system 10 as depicted in FIG. 1, while minimizing the amount of baluster inventory for accomplishing the alignment features with the foot support surface 22 and the rail slope, an increment may be added as was previously discussed. To determine the minimum number of baluster lengths needed to accomplish a system that could either have two or three balusters per tread there is one reference baluster that is exchangeable for the two baluster per tread system or the three baluster per tread system.

To be able to maintain an inventory that would allow the manufacturer a two baluster per tread system and a three baluster per tread system, the minimum number of baluster lengths may be 4. That is, the reference baluster or the first baluster, a second baluster having an increment of 3¾ units for the two baluster per tread system and 2½ units for the three baluster per tread system as well as a baluster having a turning length increment of 5 units for the three baluster per tread system thus making a total of four baluster lengths.

In creating inventories for a system that can accommodate 4, 3 or 2 balusters per tread, the inventory would include 6 baluster lengths. To create an inventory that can accommodate 5, 4, 3 or 2 balusters per tread, the inventory would include 10 unique baluster lengths. To create an inventory that could accommodate 6, 5, 4, 3 or 2 balusters per tread, an inventory of 12 unique baluster lengths would be used. The number of balusters per tread might be extended further to higher numbers and in each case the minimum number of baluster lengths needed to accommodate the patterns to have the alignments of features with the tread and the handrail changes.

Table 3 below provides a description of a number of features in baluster designations A–V. In particular, there are features that would align with the tread and features that would align with the handrail as well as a turning length segment 26 that would be incrementally changed to accommodate the alignment of the bottom length segment 27 with the tread 12 and the top length segment 25 with the handrail 16. However, "W" and "X" are contemporary square baluster which are substantially uniform along their whole length and do not have a top, bottom or turning segments per se.

TABLE 3

| BALUSTER DESIG-NATION | BALUSTER FEATURE DESCRIPTION |
|---|---|
| A | Williamsburg Baluster with Pin Top, Roped Design & Architectural Square |
| B | Williamsburg Baluster with Square Top, Fluted Design & Architectural Square |

TABLE 3-continued

| BALUSTER DESIGNATION | BALUSTER FEATURE DESCRIPTION |
|---|---|
| C | Williamsburg Baluster with Pin Top, Plain Design & Architectural Square |
| D | 1800's Baluster with Pin Top, Reeded Design & Stacked Vases |
| E | 1800's Baluster with Square Top, Plain Design & Stacked Vases |
| F | 1800's Baluster with Pin Top, Octagonal Design & Stacked Vases |
| G | Carolina Baluster with Square Top, Plain Design & Elongated Vase |
| H | Carolina Baluster with Pin Top, Twist Design & Elongated Vase |
| I | Carolina Baluster with Pin Top Fluted Design & Elongated Vase |
| J | Jefferson Baluster with Pin Top, Fluted Design & Inverted Vase |
| K | Jefferson Baluster with Pin Top, Roped Design & Inverted Vase |
| L | Jefferson Baluster with Pin Top, Octagonal Design & Inverted Vase |
| M | Jefferson Baluster with Pin Top, Plain Design & Inverted Vase |
| N | Hampton Baluster with Pin Top, Plain Design & Stacked Vases |
| O | Hampton Baluster with Square Top, Plain Design & Stacked Vases |
| P | Hampton Baluster with Square Top, Plain Design & Stacked Vases |
| Q | Baluster with Pin Top, Plain Design & Vases |
| R | Hampton Baluster with Pin Top, Plain Design & Stacked Vases |
| S | Baluster with Square Top, Plain Design & Vases |
| T | Baluster with Square Top, Plain Design & Elongated Vase |
| U | Baluster with Pin Top, Plain Design & Vase |
| V | Baluster with Pin Top, Plain Design & Vase |
| W | Contemporary Square Baluster |
| X | Contemporary Square Baluster with Design along its length |

Figure 7:
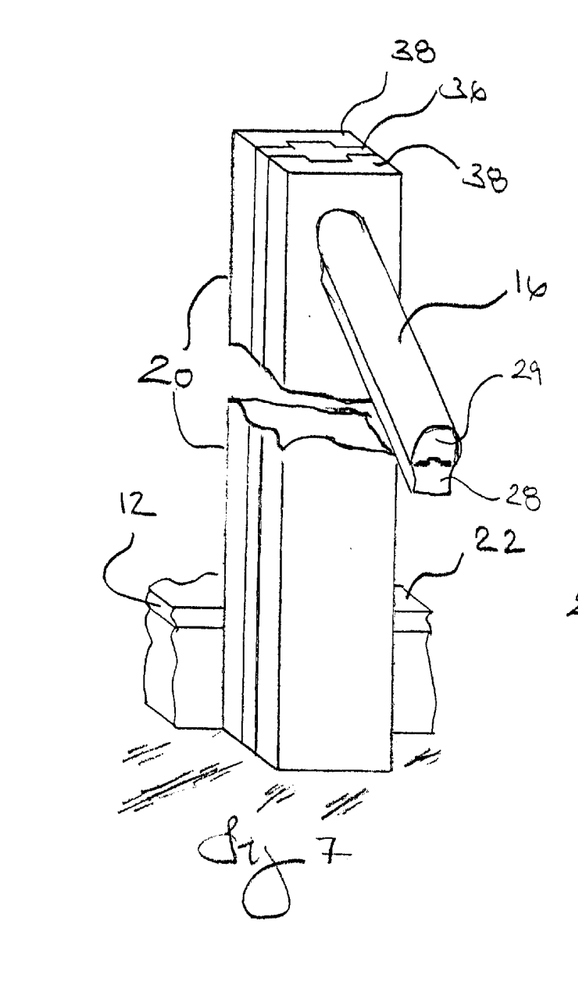
FIG. 7 is a perspective schematic illustration of a three-piece newel assembly for use with the stairway and rail system of FIG. 1.
Figures 7A, 7B:
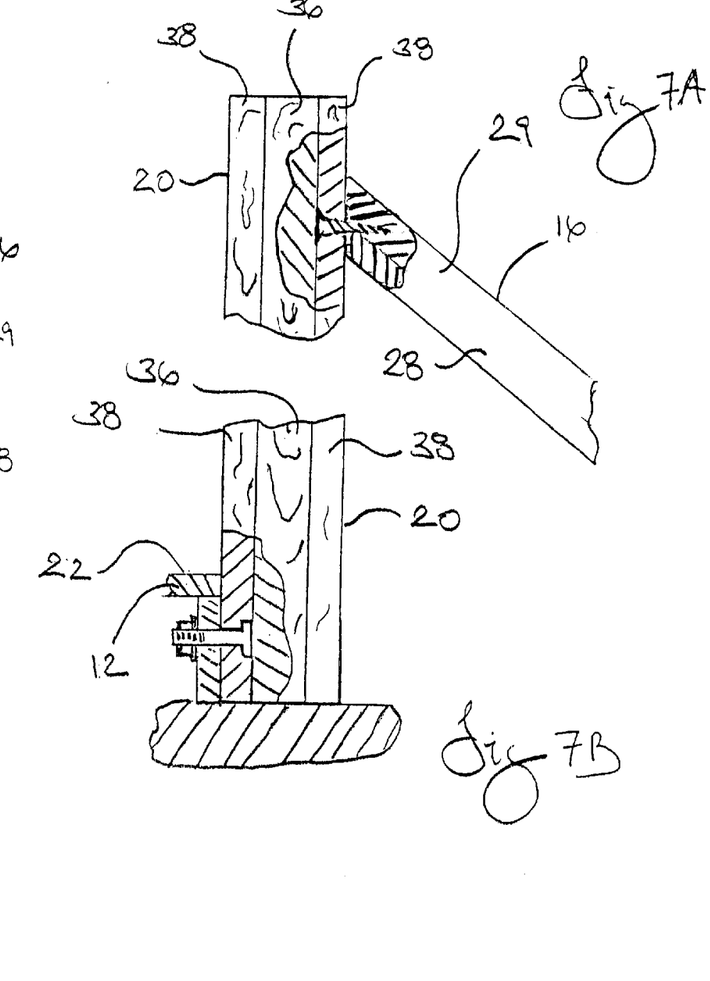
FIG. 7A is a partial cross-sectional schematic illustration showing the details of anchoring a handrail to the newel of FIG. 7.
FIG. 7B is a partial cross-sectional schematic illustration showing the details of anchoring a stairway riser to the newel of FIG. 7.

In creating the stairway system 10 of the present invention, it may be advantageous to anchor it to various portions of a structure. FIG. 7 depicts a lateral support 20, in particular a newel, that is made as an assembly of materials according to the present invention that may be easily installed by those in the labor market having a lower than an adequate competence level of skill and those in the "do-it-yourself" market. In particular, FIG. 7 shows a three-piece newel assembly 20 that includes a center core 36 and substantially identical outer members 38. An advantage of the three-piece newel assembly 20 is illustrated by FIGS. 7A and 7B. In particular, an installation of the three-piece newel assembly 20 may eliminate a need for complex drilling and cutting for joining either to a handrail 16 or a riser of the stair system 10. Since three-piece newel assembly 20 may come as an unassembled assembly, outer member 38 may be fastened either to a handrail 16 or a riser of the stair system 10 by one or more fasteners such as screws, bolt and nut combinations, and nails. Thereafter, the core member 36 and the remaining outer member 38 may be added to the fastened outer member 38 to hide the fasteners and create an aesthetically pleasing piece.

Figures 8A, 8B:
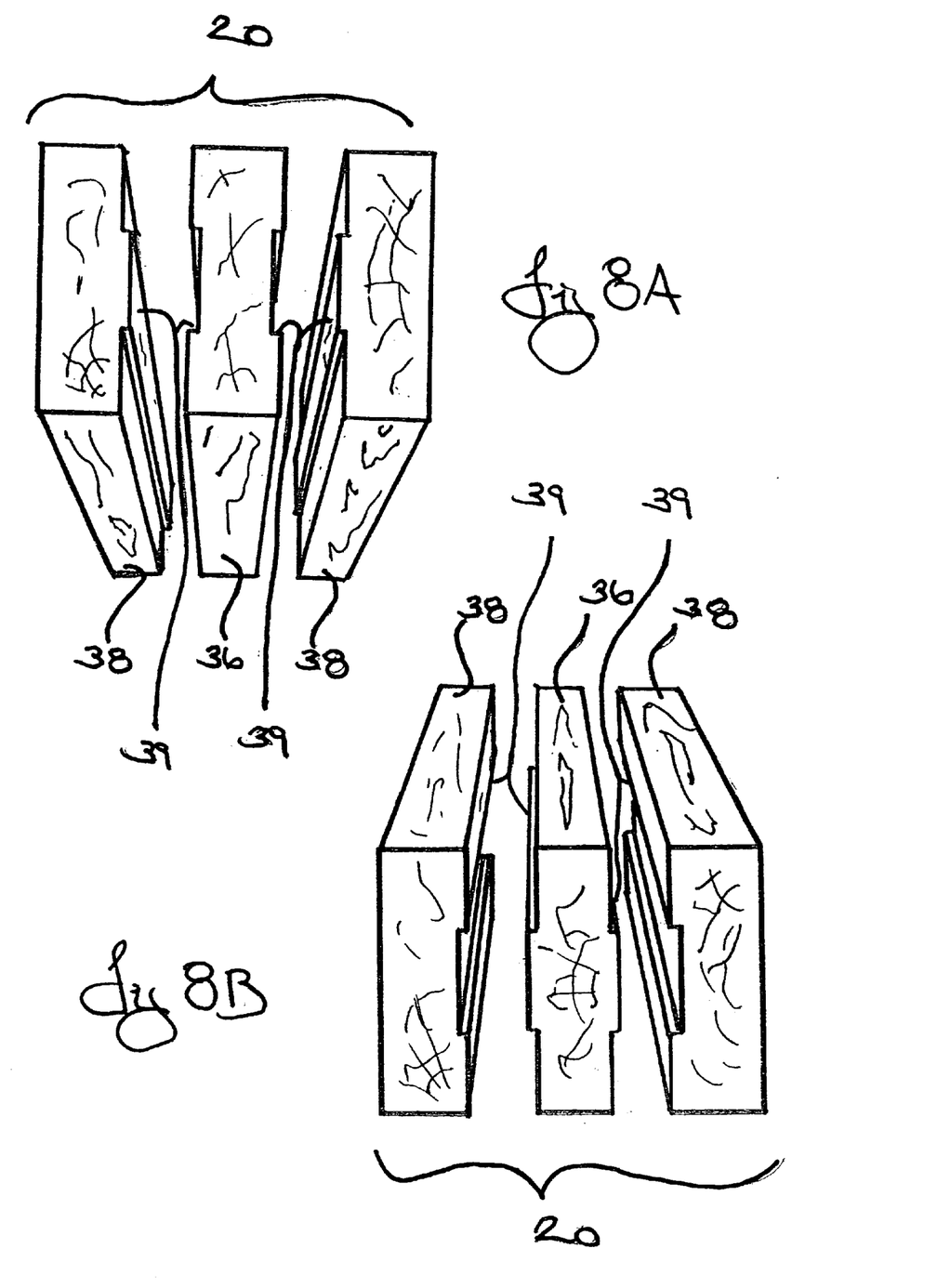
FIGS. 8A and 8B are exploded perspective schematic illustrations of alternative newel constructions as might be used in, for example, FIGS. 1 and 7.

FIGS. 8A and 8B show exploded versions of the three-piece newel assembly 20 of FIG. 7. In particular, details of FIGS. 8A and 8B emphasize mating alignment grooves 39 for aligning the outer surfaces of the center core 36 and the outer surfaces of the two substantially identical outer members 38. FIG. 8A depicts the alignment grooves 39 within the center core 36 while FIG. 8B shows the alignment grooves 39 within the two substantially identical outer members 38. Again, these configurations permit one of the outer members to be fastened either to a handrail 16, a riser, or the floor using standard fasteners such as screws, nails, nuts, bolts and the like. A joining of the center core 36 and the remaining substantially identical outer member 38 permits the hiding of these fasteners. Further, the features of the alignment grooves 39 allow unskilled laborers and "do-it-yourselfers" to create a lateral support 20 that might otherwise require a skilled carpenter.

Figure 9A:
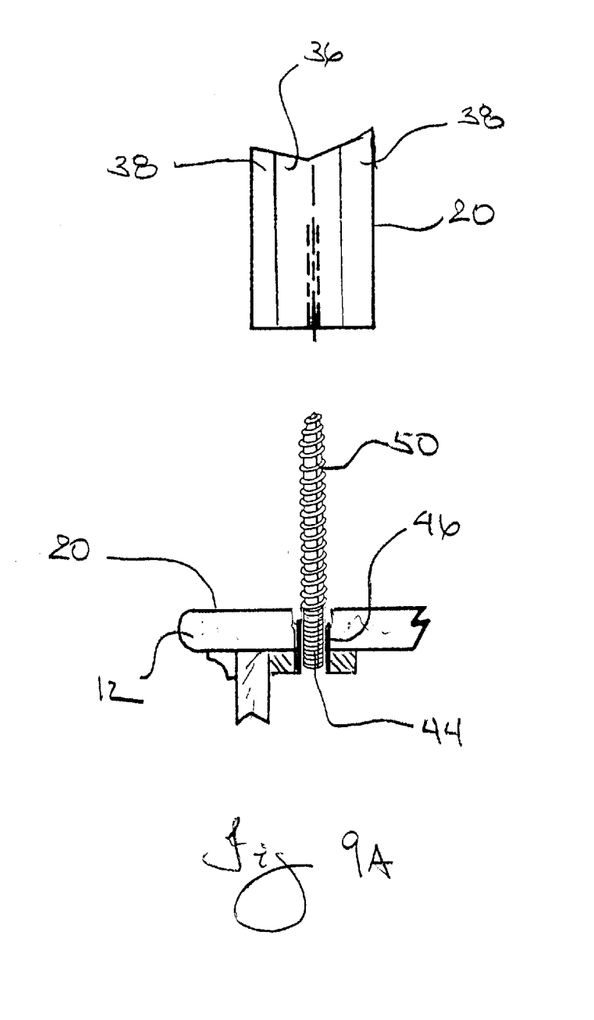
FIG. 9A is a schematic illustration of an alternative tread mounted anchoring system as might be used in, for example, FIGS. 1 and 7.

An alternative anchoring of a lateral support 20 to a tread 12 is depicted in FIG. 9A as being done using an anchor 42. The anchor 42 may include a bolt 44, a plate 52, a mounting column 46 that is in communication with the plate 52 to create a biasing of the plate 52 against the bottom of the tread 12, and the bolt 44 has on its other end a wood screw 50 which engages the lateral support 20 to create a good firm attachment of the staircase to the tread 12.

Figure 9B:
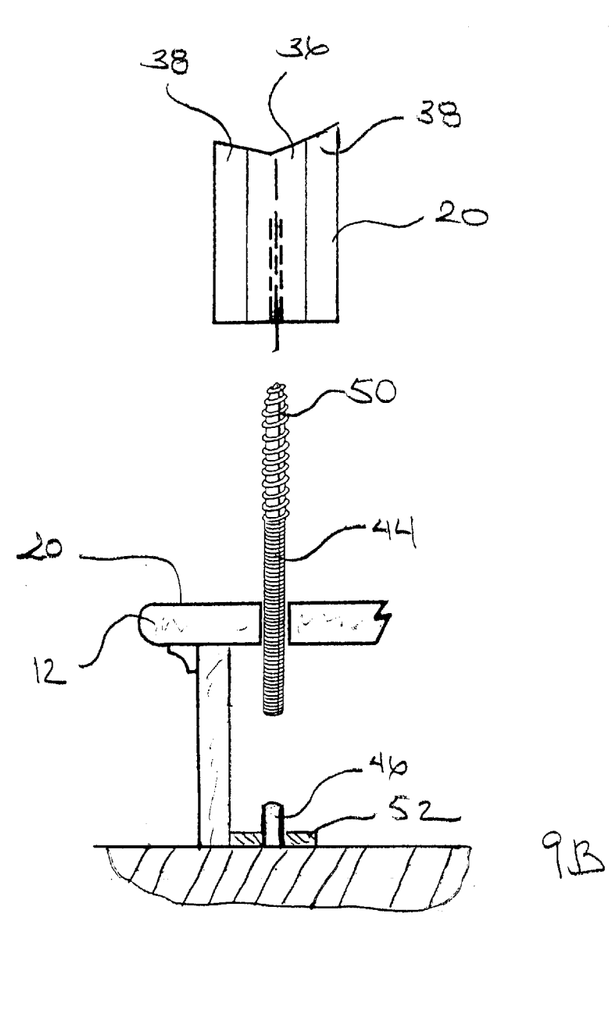
FIG. 9B is a schematic illustration of an alternative floor mounted anchoring system as might be used in, for example, FIGS. 1 and 7.

An alternative method of using the anchor 42 is shown in FIG. 9B. In this case, the plate 52 including the mounting column 46 is fastened to the floor and the bolt 44 has a length such that it can extend through the tread 12 into the mounting column 46 over the riser height. Then the wood screw end 50 engages the lateral support 20.

Figure 10:
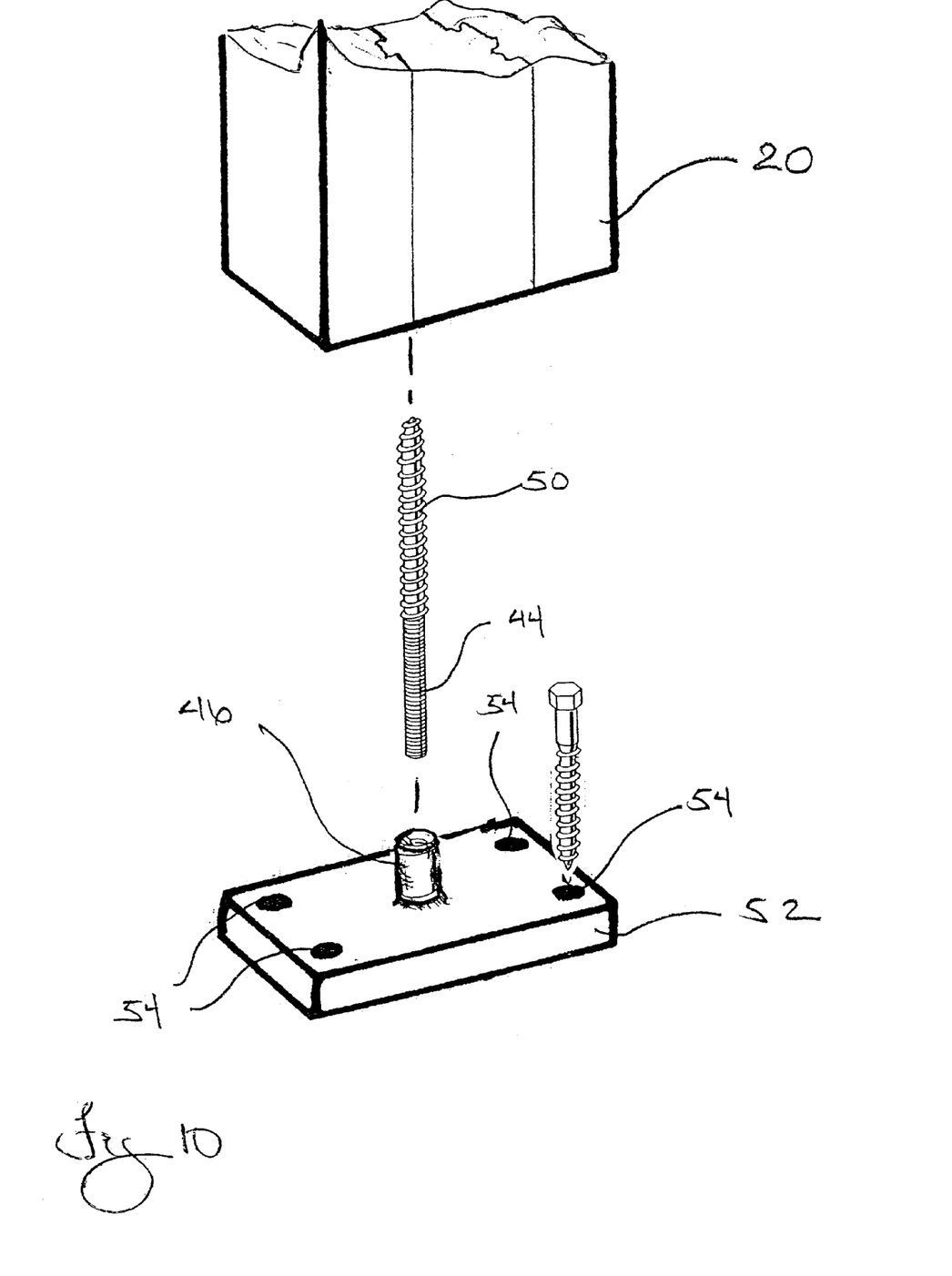
FIG. 10 is an exploded perspective schematic illustration of the anchoring system of FIGS. 9A and 9B.

A more detailed drawing of the flexible anchor 42 is shown in FIG. 10. Here it is seen that the plate 52 can include apertures for attaching the plate 52 either to the floor by use of, for example, a fastener such as a wood bolt, or alternatively to the bottom of a tread 12. Again there is a bolt 44 that engages the mounting column 46 and a wood screw end 50 that engages the lateral support 20. Although not depicted in FIG. 7, there could be a tread 12 placed between the lateral support 20 and the plate 52 and as previously described the plate 52 can either be in contact with the tread 12 or mounted directly to the floor.

Certain modifications and improvements will occur to those skilled in the art upon a reading of the foregoing description. By way of example, the top segment of the two-piece handrail is normally glued to the bottom segment but it could also be screwed to the bottom segment through the bottom of the bottom segment. It should be understood that all such modifications and improvements have been deleted herein for the sake of conciseness and readability but are properly within the scope of the following claims.

We claim:

1. A two-piece handrail assembly for creating a handrail for use in a stairway rail system, said stairway system including a plurality of spaced apart treads and at least one baluster per tread, said two-piece handrail assembly comprising:
    (a) a top segment;
    (b) a bottom segment;
    (c) a mating groove on one of said top segment and said bottom segment for aligning said top segment with said bottom segment; and
    (d) a fastener groove between said top segment and said bottom segment for permitting the accommodation of fasteners used to attach said handrail to each baluster.

2. The two-piece handrail assembly according to claim 1, further including an attachment means for attaching said handrail to each baluster.

3. The two-piece handrail assembly according to claim 2, wherein said attachment means is a plow for receiving the top of a square top baluster.

4. The two piece handrail assembly according to claim 3, further including a pin top baluster adapter for receiving the top of a pin top baluster.

5. The two piece handrail assembly according to claim 4, wherein said pin top baluster adapter is a strip with a plurality of spaced apart openings.

6. The two piece handrail assembly according to claim 2, wherein said attachment means further includes fillet strips between adjacent balusters.

7. The two piece handrail assembly according to claim 1, wherein said top segment and said bottom segment are each made from lumber having a rough-cut designation of between about 5/4 and 6/4.

8. The two piece handrail assembly according to claim 7, wherein said rough-cut designation is about 5½/4.

9. A stairway and rail system, said stairway system comprising:
   (a) a plurality of spaced apart treads;
   (b) at least one baluster per tread;
   (c) a two-piece handrail assembly, said handrail including: (i) a top segment; (ii) a bottom segment; (iii) a mating groove on one of said top segment and said bottom segment for aligning said top segment with said bottom segment; and (iv) a fastener groove between said top segment and said bottom segment for permitting the accommodation of fasteners used to attach said handrail to each baluster; and
   (d) a lateral support for supporting said handrail.

10. The stairway system according to claim 9, wherein said lateral support is a newel.

11. The stairway system according to claim 10, wherein one end of said newel is connected to said handrail and the other end of said newel is anchored.

12. The stairway system according to claim 11, wherein said newel is connected to the ends of said handrail.

13. The stairway system according to claim 11, wherein said newel is vertically anchored.

14. The stairway system according to claim 13, wherein said newel is anchored to the floor of a structure.

15. The stairway system according to claim 13, wherein said newel is anchored to at least one tread.

16. The stairway system according to claim 13, wherein said vertically anchored newel includes a bolt and a mounting column.

17. The stairway system according to claim 16, wherein one end of said bolt is a wood screw for attaching to said newel.

18. The stairway system according to claim 16, wherein said mounting column further includes a mounting plate attached to said mounting column.

19. The stairway system according to claim 18, wherein said mounting plate includes a plurality of apertures for receiving fasteners for attaching said plate to the floor of a structure.

20. The stairway system according to claim 10, wherein said newel is a three-piece newel assembly.

21. The stairway system according to claim 20, wherein said three-piece newel assembly includes a center core and two substantially identical outer members.

22. The stairway system according to claim 21, said three-piece newel assembly further including a mating alignment groove on one of said center core and said two substantially identical outer members.

23. The stairway system according to claim 22, wherein said mating alignment groove includes protrusions on one of said center core and said two substantially identical outer members and receiving grooves on the other of said center core and said two substantially identical outer members.

24. The stairway system according to claim 9, wherein said spaced apart treads include a foot support surface and means for attaching said foot support surface to a structure.

25. The stairway system according to claim 24, wherein a width of said foot support surface is greater than a depth of said foot support surface.

26. The stairway system according to claim 24, wherein said means for attaching said spaced apart treads to the structure is a stringer.

27. The stairway system according to claim 24, wherein said means for attaching the spaced apart treads to the structure is by wall mounting.

28. The stairway system according to claim 9, wherein said spaced apart treads are spaced at a uniform riser height.

29. The stairway system according to claim 28, wherein said uniform riser height varies between about 6" and 9".

30. The stairway system according to claim 29, wherein said uniform riser height is about 7½".

31. The stairway system according to claim 9, further including at least two balusters per tread, each baluster having a top length segment, a bottom length segment and a turning length segment, said turning length segment including a defined feature.

32. The stairway system according to claim 9, further including an attachment means for attaching said handrail to each baluster.

33. The stairway system according to claim 32, wherein said attachment means is a plow for receiving the top of a square top baluster.

34. The stairway system according to claim 33, further including a pin top baluster adapter for receiving the top of a pin top baluster.

35. The stairway system according to claim 34, wherein said pin top baluster adapter is a strip with a plurality of spaced apart openings.

36. The stairway system according to claim 32, wherein said attachment means further includes fillet strips between adjacent balusters.

37. The stairway system according to claim 9, wherein said top segment and said bottom segment are each made from lumber having a rough-cut designation of between about 5/4 and 6/4.

38. The stairway system according to claim 37, wherein said rough-cut designation is about 5½/4.

* * * * *